(12) United States Patent
De Verdier et al.

(10) Patent No.: US 6,241,284 B1
(45) Date of Patent: Jun. 5, 2001

(54) IMPACT-ABSORBING DEVICE FOR PROTECTION OF PASSENGERS IN A VEHICLE

(75) Inventors: Joachim De Verdier, Västra Frölunda; Lars Furtenbach, Piteå; Björn Andersson, Vidsel; Niklas Asplund, Luleå, all of (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/445,574

(22) PCT Filed: Jun. 23, 1998

(86) PCT No.: PCT/SE98/01212

§ 371 Date: Aug. 8, 2000

§ 102(e) Date: Aug. 8, 2000

(87) PCT Pub. No.: WO98/58831

PCT Pub. Date: Dec. 30, 1998

(30) Foreign Application Priority Data

Jun. 23, 1997 (SE) .................................................. 9702376

(51) Int. Cl.[7] .................................................. B62D 1/99
(52) U.S. Cl. ............................................. 280/777; 74/493
(58) Field of Search ............................... 280/777; 74/492, 74/493

(56) References Cited

U.S. PATENT DOCUMENTS

| | | | |
|---|---|---|---|
| 3,788,148 | | 1/1974 | Connell et al. ........................ 74/492 |
| 4,006,647 | | 2/1977 | Oonuma et al. ........................ 74/492 |
| 4,786,076 | | 11/1988 | Wierschem .......................... 280/777 |
| 4,978,138 | | 12/1990 | Hikone et al. ....................... 280/777 |
| 5,476,284 | * | 12/1995 | DuRocher et al. ................... 280/777 |
| 5,575,501 | | 11/1996 | Moriyama et al. ................... 280/777 |
| 5,769,455 | * | 6/1998 | Duval et al. ......................... 280/777 |
| 5,813,794 | * | 9/1998 | Castellon ............................. 403/359 |
| 5,845,936 | * | 12/1998 | Higashino ........................... 280/775 |
| 5,954,362 | * | 9/1999 | Aota et al. ........................... 280/777 |
| 6,026,704 | * | 2/2000 | Shibata et al. ......................... 74/496 |
| 6,099,037 | * | 8/2000 | Korzan ................................ 280/777 |

FOREIGN PATENT DOCUMENTS 19 62 183   10/1980   (DE) .

* cited by examiner

Primary Examiner—Eric Culbreth
Assistant Examiner—L. Lum
(74) Attorney, Agent, or Firm—Lerner, David, Littenberg, Krumholz & Mentlik, LLP

(57) ABSTRACT

Apparatus is disclosed for protecting the driver of a motor vehicle including a steering bracket for supporting the main steering shaft of the motor vehicle, the steering bracket including a first portion mounted on the body of the motor vehicle and a second portion mounted on the main steering shaft, the first and second portions being relatively displaceable with respect to each other, an energy absorbing tube which includes a number of grooves having different deformation resistances, a knife mounted adjacent to the energy absorbing tube so that upon relative displacement of the two portions of the steering bracket, the knife moves along one of the grooves, and a controller for setting the position of the knife with respect to one of the grooves whereby the deformation resistance of the energy absorbing tube can be adjusted by the controller.

19 Claims, 3 Drawing Sheets

IMPACT-ABSORBING DEVICE FOR PROTECTION OF PASSENGERS IN A VEHICLE

FIELD OF THE INVENTION

The present invention relates to apparatus for the protection of passengers in a motor vehicle, comprising a steering bracket which supports a steering main shaft.

BACKGROUND OF THE INVENTION

In connection with motor vehicles, it is generally desirable to reduce force stresses and associated injuries to the occupants of the vehicle to the greatest possible extent in the event of a collision. For example, safety belts of the three-point type are generally used to secure the occupants of the vehicle. Such safety belts provide, in a known manner, a good protective effect and increased safety for the occupants in the event of a collision.

There are always drivers, however, who for various reasons choose not to use a safety belt. In order to also afford these drivers a certain degree of protection in the event of a collision, it has become desirable for the steering system of the vehicle to be adapted so that it is energy-absorbing. Furthermore, legislation in certain countries now requires the steering system in a vehicle to be designed to protect drivers who are thrown against the steering wheel of the vehicle in the event of a collision.

It is known that the steering system in a vehicle can be designed so that it absorbs energy when the driver of the vehicle is thrown forward and strikes the steering wheel during a collision. Such energy absorption can be brought about, for example, by the steering wheel being designed with deformable and flexible spokes. Furthermore, the main steering shaft of the vehicle can be arranged in a specially designed energy-absorbing steering column which is, in turn, mounted on the body of the vehicle. In the event of a collision, when the steering wheel, and consequently the steering column, are acted on by a very great force as a result of the driver being thrown forward, this force is transmitted from the steering wheel to the steering column. This results in the steering column being moved a certain distance in relation to the vehicle body. During this movement, energy is absorbed, which in turn reduces the stresses on the driver during the course of the crash.

In U.S. Pat. No. 4,978,138, apparatus for energy absorption in a steering system for vehicles is described. The apparatus functions according to the principle that if the driver is not secured by a seat belt, the steering system will absorb energy when the driver is thrown against the steering wheel in the event of a collision. For this purpose, the apparatus comprises a deformable, energy-absorbing plate which is connected to the steering column. In order to determine whether the driver has the seat belt on, a sensor is arranged in association with the fastening of the seat belt. This known apparatus also comprises a device for the protection of the knees of the driver, which device is activated depending on whether or not the driver is secured by the seat belt. If the driver is secured, the force from the knees of the driver will be absorbed by the knee protection device while the steering wheel is moved, by virtue of which the upper body and the head of the driver are prevented from striking the steering wheel.

The apparatus according to U.S. Pat. No. 4,978,138 does have a disadvantage, however, in that it does not make allowance for the risk that even a driver who is secured with a safety belt can, under certain circumstances, actually strike the steering wheel during a collision. This can happen, for example, if the driver has the vehicle seat positioned in a far forward position or if the seat belt has an abnormally large amount of slack.

One object of the present invention is to produce an improved and simplified energy-absorbing apparatus for steering systems in motor vehicles. In particular, the present invention is intended to make available such a protective apparatus which comes into operation in the event of a collision irrespective of whether or not the driver of the motor vehicle is using a safety belt.

SUMMARY OF THE INVENTION

In accordance with the present invention, this and other objects have now been realized by the invention of apparatus for protecting the driver of a motor vehicle including a main steering shaft, the apparatus comprising a steering bracket for supporting the main steering shaft, the steering bracket including a first portion mounted on the body of the motor vehicle and a second portion mounted on the main steering shaft, the first and second portions of the steering bracket being relatively displaceable with respect to each other, an energy absorbing member including a plurality of grooves including a first groove having a first deformation resistance and a second groove having a second deformation resistance, the first and second deformation resistances being different, a cutting member mounted adjacent to the energy absorbing member whereby upon the relative displacement of the first and second portions of the steering bracket the cutting member moves along one of the first and second grooves, and setting means for setting the position of the cutting member with respect to the one of the first and second grooves, whereby the deformation resistance of the energy absorbing member can be adjusted by the setting means. In a preferred embodiment, the energy-absorbing member includes a plurality of additional grooves, and each of the plurality of additional grooves has a different deformation resistance.

In accordance with one embodiment of the apparatus of the present invention, the energy-absorbing member comprises a tubular member having a first end and a second end, and the plurality of grooves are disposed longitudinally along the tubular member from the first end of the tubular member, the tubular member being connected to one of the first and second portions of the steering bracket and the cutting member being connected to the other of the first and second portions of the steering bracket.

In accordance with another embodiment of the apparatus of the present invention, the energy-absorbing member comprises a tubular member having a first end, a second end, and a first predetermined thickness, the first and second grooves having a second and third predetermined thickness, the first predetermined thickness being greater than the second and third predetermined thicknesses, and the second and third predetermined thicknesses being different.

In accordance with another embodiment of the apparatus of the present invention, the first groove has a first width and the second groove has a second width, the first width being different from the second width.

In accordance with another embodiment of the apparatus of the present invention, the energy-absorbing member comprises a first predetermined material having a first predetermined deformation resistance, and the first and second grooves comprise a second predetermined material having a second predetermined deformation resistance, the second predetermined deformation resistance being less than the first predetermined deformation resistance.

In accordance with another embodiment of the apparatus of the present invention, the apparatus includes weight measurement means for measuring the weight of a driver seated in the motor vehicle, the weight measurement means being coupled to the setting means whereby the weight of the driver can be used to determine the position set by the setting means.

In accordance with another embodiment of the apparatus of the present invention, the energy-absorbing member comprises a tubular member having a first end and a second end, and including a rotatable guide piston connected to one of the first and second portions of the steering bracket at the first end of the tubular member, the cutting member being mounted on the rotatable guide piston.

In accordance with another embodiment of the apparatus of the present invention, the energy-absorbing member comprises a tubular member, the cutting member being attached to one of the first and second portions of the steering bracket, and the tubular member being rotatably mounted on the other of the first and second portions of the steering bracket.

In accordance with another embodiment of the apparatus of the present invention, the setting means comprises an electric actuator, and the apparatus includes a servomotor coupled to the electric actuator, and gear means driven by the servomotor, the gear means connected to the rotatable guide piston whereby the electric actuator controls the setting of the position of the cutting member with respect to the first and second grooves.

In accordance with another embodiment of the apparatus of the present invention, the energy-absorbing member comprises a tubular member, and the setting means comprises an electric actuator, including a servomotor coupled to the electric actuator, and gear means driven by the servomotor, the gear means connected to the tubular member, whereby the electric actuator controls the setting of the position of the cutting member with respect to the first and second grooves.

In accordance with another embodiment of the apparatus of the present invention, the apparatus includes a detector for detecting whether or not a driver of the motor vehicle is wearing a seat belt, the detector coupled to the setting means whereby the detector can be used to determine the position set by the setting means.

In accordance with another embodiment of the apparatus of the present invention, the cutting member includes a plurality of cutting members for interacting with the plurality of grooves.

In accordance with another embodiment of the apparatus of the present invention, the apparatus includes a rotatable guide piston having a first end and a second end and connected to one of the first and second portions of the steering bracket at the first end of the tubular member, and wherein the tubular member is affixed to the first portion of the steering bracket, and including a force transmission member for transmitting a force between the first and second portions of the steering bracket, the force transmission member comprising a cable having a first end affixed to the first end of the rotatable guide piston and passing through the tubular member and including a second end affixed to the other of the first and second portions of the steering bracket. In a preferred embodiment, the apparatus includes a guide member for guiding the cable from the second end of the tubular member to the other of the first and second portions of the steering bracket. Preferably, the guide member comprises a pulley.

In accordance with another embodiment of the apparatus of the present invention, the first end of the tubular member includes at least one notch disposed at an end of one of the plurality of grooves, whereby the notch can guide the cutting member to the at least one of the plurality of grooves. Preferably, the first end of the tubular member is saw-toothed including a plurality of the notches, each of the plurality of notches being disposed at the end of one of the plurality of grooves.

The objects of the present invention are achieved by apparatus which comprises means for setting the cutting member to a predetermined groove and in which at least two grooves have different deformation resistance in relation to one another, by virtue of which the deformation resistance in the energy-absorbing mechanism can be adjusted by setting the cutting member to a predetermined groove.

According to one embodiment of the present invention, the energy-absorbing mechanism comprises a tube, the grooves being arranged in the longitudinal direction of the tube, from a first end of the tube, the tube being connected to one of the two displaceable portions of the steering bracket and the cutting member being connected to the other portion. Alternatively, the grooves can be arranged in a plate, a half-tube, a U beam or the like.

The grooves in the energy-absorbing mechanism can have different deformation resistances by the grooves having a smaller material thickness than the surrounding parts of the material in the energy-absorbing mechanism, at least two grooves having different material thickness in relation to one another.

Another manner of bringing about different deformation resistance is by at least two grooves being of different width in relation to one another. In this respect, the width of the knife must be taken into account so that the width of the grooves lies within the range in which the knife, when introduced into the groove, will effectively widen same.

A further manner of bringing about different deformation resistances in different grooves is by the material in the grooves having a different physical nature to the surrounding material in the energy-absorbing mechanism. This can be achieved, for example, by the material in the grooves being treated so that it becomes softer or more porous than the surrounding material. It is of course possible to envision designing an energy-absorbing mechanism in which the grooves consist of a different material as compared to the surrounding portions of the energy-absorbing mechanism.

The grooves in the energy-absorbing mechanism perform two main functions. In the event of a collision, is intended that the cutting member, which consists of a knife for example, will cut open the material in the energy-absorbing mechanism along a predetermined groove by the action of the force to which the steering column is subjected when the driver is thrown against the steering wheel of the vehicle. In a preferred embodiment of the present invention, the material thickness in the groove influences the deformation resistance in the energy-absorbing mechanism. By selecting the groove depth, it is possible to determine in advance the extent to which the groove will resist deformation by the cutting member under the action of a predetermined force.

Another primary function of the groove is to guide the cutting member along the groove so that cutting deformation in the course of the collision takes place in a predetermined and controlled manner.

Grooves of this type can be produced, for example, by milling out material from the energy-absorbing mechanism, by etching, or by the energy-absorbing mechanism comprising a component which is from the outset cast or molded into the desired shape. It is also possible to use grooves with a groove depth which varies along the length of the groove.

Given that the energy-absorbing mechanism comprises a tube, it is advantageous if the tube has two or more longitudinal grooves. In this respect, it is particularly advantageous if at least two, and preferably more, of the grooves have different material thicknesses in relation to one another. This is because such an embodiment makes it possible to select the deformation resistance for the energy-absorbing mechanism by setting the cutting member to a suitable groove.

To effectuate setting of the deformation resistance, either the cutting member or the tube is mounted rotatably on the respective steering bracket portion. Accordingly, the cutting member can be mounted on a guide piston which is mounted rotatably on one steering bracket portion and is introduced at the first end of the tube, while the tube is fixed. Alternatively, a possibility f or rotation of the tube and the cutting member in relation to one another is obtained by virtue of the cutting member being fixed on one steering bracket portion, while the tube is mounted rotatably on the other steering bracket portion.

An arrangement according to the present invention can thus comprise special means for setting the cutting member to a predetermined groove. An example of such means is an electric actuating device which can advantageously be arranged to control the setting of the deformation resistance in the energy-absorbing mechanism by being coupled to a servomotor which drives a gear arrangement. The gears are, in turn, coupled to either the tube or the guide piston, depending on which of these is rotatable.

The means for setting the cutting member can in turn be coupled to a weight transducer which is arranged for registering the weight of the driver so that the setting of the cutting member can be adapted to the driver's weight. In a corresponding manner, the setting of the cutting member can be adjusted by the means for setting the cutting member being coupled to apparatus which is adapted to detect a state which indicates whether or not the driver has the seat belt on. In this respect, it is suitable to register in the fastening apparatus of the safety belt whether or not the locking tongue of the safety belt is introduced into the fastening arrangement.

It is possible to envisage embodiments in which two or more cutting members are arranged for interaction with grooves arranged in the energy-absorbing mechanism.

It is also conceivable to use more than one energy-absorbing mechanism for the steering system in one and the same vehicle. For example, two or more tubes can be arranged on that surface of the upper portion which faces the lower portion, while the cutting members are on the one hand fixed to a guide piston introduced into the tube and on the other hand fixed to the lower portion. In such an embodiment, the lower portion is consequently mounted on the cutting members. Alternatively, the energy-absorbing mechanism can be arranged the other way round, that is to say with the cutting members fixed on the upper portion and the tubes fixed on the lower portion.

According to a preferred embodiment, the tube forming portion of the energy-absorbing mechanism is fixed to the upper portion of the steering bracket. The force-transmitting member between the upper portion and the lower portion consists of a cable which is fixed at a first end in a guide piston at the first end of the tube and runs through the tube and out through a second end of the tube by means of a guide member, such as a pulley, arranged outside the tube and is fixed to a second end in the lower portion.

In order to ensure that the cutting member is directed towards a groove in the tube, the tube can have at its first end at least one notch or recess in the end edge of the tube at the beginning of a groove in the tube, the notch or the recess constituting a guide member for guiding the cutting member towards the groove. When the tube is provided with a number of grooves arranged around its periphery, the end edge of the tube can be saw-toothed, each notch between two saw-teeth being arranged at the beginning of a groove in the tube.

The present invention is intended for motor vehicles which comprise a steering column supporting a main steering shaft. The steering column is mounted in the motor vehicle in a manner which allows for movement in relation to the vehicle body in the event that the steering column is subjected to the action of a force during a collision by the driver of the vehicle being thrown against the steering wheel.

BRIEF DESCRIPTION OF THE DRAWINGS

The present invention will be described in greater detail below with reference to the detailed description which is shown in the appended drawings, in which:

FIG. 5b is a side, elevational, partial, enlarged view of a portion of the apparatus shown in FIG. 5a.

DETAILED DESCRIPTION

Figure 1:
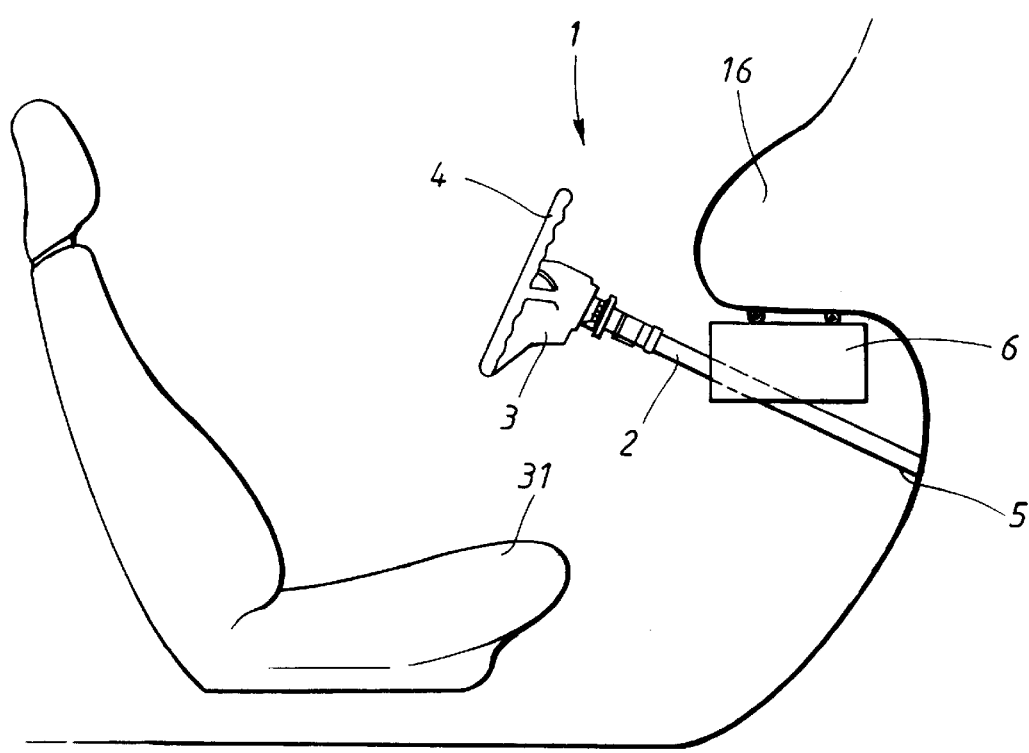
FIG. 1 is a side, elevational, partially diagrammatic view of the driver's seat in a motor vehicle with a steering arrangement provided with an energy-absorption apparatus according to the present invention.

Referring to the drawings, in which like reference numerals refer to like elements thereof, FIG. 1 shows a simplified side view of the driver's seat in a motor vehicle with an energy-absorbing apparatus according to the present invention. The arrangement I is primarily intended to be used in connection with motor vehicles, such as private cars. The vehicle is, in a known manner, provided with a main steering shaft 2 which supports a steering wheel 4 at an upper end 3. At a lower end 5, the main steering shaft 2 is connected to a steering apparatus (not shown) which, in a known manner, is intended for steering the wheels of the vehicle.

Figure 2:
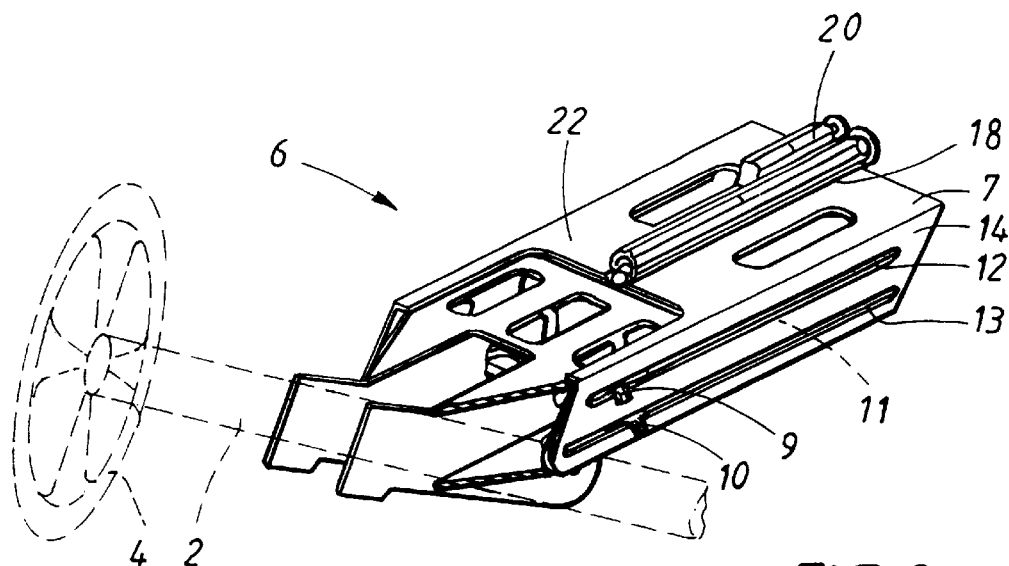
FIG. 2 is a side, perspective view of the energy-absorption apparatus shown in FIG. 1.

The main steering shaft 2 is mounted in a steering bracket 6 in a manner which is known per se, and which is therefore not described in detail in this context. The connection between the steering bracket and the main steering shaft 2 can comprise, for example, means (not shown) for adjusting the main steering shaft 2 in the upward and downward directions. Furthermore, the steering bracket 6 is generally box-shaped and comprises, as can be seen from FIG. 2, an upper part 7 and a lower part 8 which are slidably interconnected. Accordingly, the lower part 8 is inserted into the upper part 7 and has two pins, 9 and 10, which project from, a side surface 11 on the lower part 8 and which are arranged to interact with two parallel slots, 12 and 13, which are arranged in a corresponding side surface 14 on the upper part 7.

The upper part 7 of the steering bracket 6 is fixed to the underside of the instrument panel 16 of the vehicle and the main steering shaft 2 is fixed to the lower part of the steering bracket 6. The fact that the upper part 7 of the steering bracket is slidably connected to the lower part 8 means that the main steering shaft 2 can be moved in relation to the instrument panel 16 by displacement of the lower part 8 of the steering bracket 6 in relation to the upper part 7.

Figure 3:
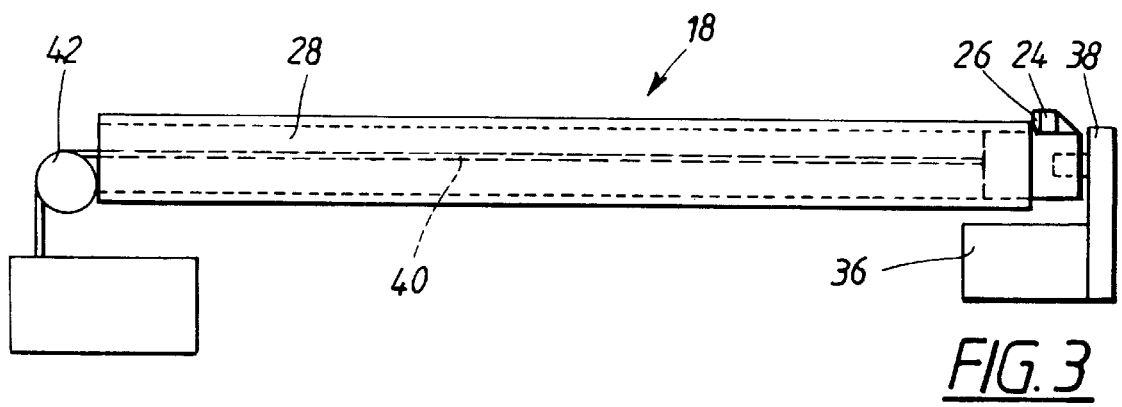
FIG. 3 is a side, elevational view of the energy absorbing mechanism in the energy-absorption apparatus shown in FIG. 2.
Figure 4:
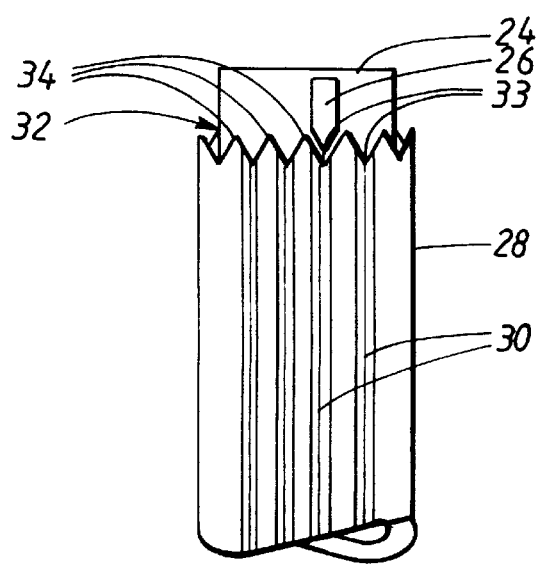
FIG. 4 is a top, elevational, partial view of a detail of the mechanism in FIG. 3.

The steering bracket 6 also has an energy-absorbing mechanism 18 which, together with an electric actuating device 20, is centrally mounted on that surface 22 of the upper part 7 facing the instrument panel 16. As can be seen most clearly in FIG. 3, the energy-absorbing mechanism 18 comprises a guide piston 24, on which a knife 26 is mounted. The guide piston 24 is introduced at one end of a tube 28, which is provided with a number of grooves 30, or recesses of a reduced material thickness. As can best be seen in FIG. 4, the end edge 32 of the tube 28 is designed with a saw-toothed profile, each of the grooves 30 in the tube 28 beginning in a notch 33 between two saw-teeth 34 at the end edge 32 and running parallel in the longitudinal direction of the tube The saw-toothed end edge 32 on the tube 28 ensures that the knife follows a given groove 30 from the outset by always guiding the knife into the notch 33 between two saw-teeth 34. Even if the knife arrives directly in front of a saw-tooth 34, it will still be guided into the notch 33 and in towards one of the grooves 30 closest to the saw-tooth 34.

In order to make it possible to set the energy-absorbing mechanism 18 so that the deformation resistance in the mechanism can be changed, the grooves 30 have different depths in the radial direction of the tube 28. This means that the material thickness in the tube 28 varies among the different grooves. By virtue of this, it is possible to adapt the deformation resistance according to whether or not the driver of the vehicle is equipped with a safety belt. It is also possible to select different deformation resistances depending on the weight of the driver.

A further manner of adjusting the deformation resistance is by angling the cutting surface of the knife in relation to the tube. In this respect, the knife can have a predetermined angle, which can be different for different deformation mechanisms, but which is constant for each individual mechanism. Alternatively, the knife can be coupled to a control and adjustment arrangement (not shown) which makes it possible to set the knife at different angles for one deformation mechanism. The latter variant increases the possibility of selecting an optimum deformation resistance for each car driver.

In order to make possible the setting of the deformation resistance, the vehicle is suitably provided with an arrangement (not shown) which is adapted to detect a state which indicates whether or not the driver of the vehicle has the seat belt on. Such an arrangement is preferably connected to the fastening apparatus of the seat belt and detects whether the locking tongue of the seat belt is securely locked. This indicates that the driver is using the seat belt. The information from the fastening arrangement of the seat belt is transmitted to the electric actuating device 20 which is mounted on the upper part 9 of the steering bracket 6. The actuating device 20 controls the setting of the deformation resistance in the energy-absorbing mechanism 18 by means of a servomotor 36 which drives gears 38, rotating the piston 24 so that the knife 26 fixed on the piston is guided towards a groove 30 suitable for the particular circumstances.

In a corresponding manner, the vehicle can be provided with apparatus which is adapted to detect the weight of the driver. In this respect, such apparatus is suitably placed in or associated with the driver's seat 31 of the vehicle. The information regarding the weight of the driver is also transmitted to the actuating device 20 and is used to select that groove 30 in the energy-absorbing mechanism 18 which offers, optimum deformation resistance with regard to the weight of the driver, whether or not the driver is equipped with a safety belt.

The piston 24 which is introduced into the tube 28 on the energy-absorbing mechanism 18 is connected to the lower part 8 of the steering bracket 6 by means of a cable 40 which runs around a pulley 42. In this respect, the cable is fastened, for example, by being welded, riveted or screwed firmly to the lower part.

Figure 5A:
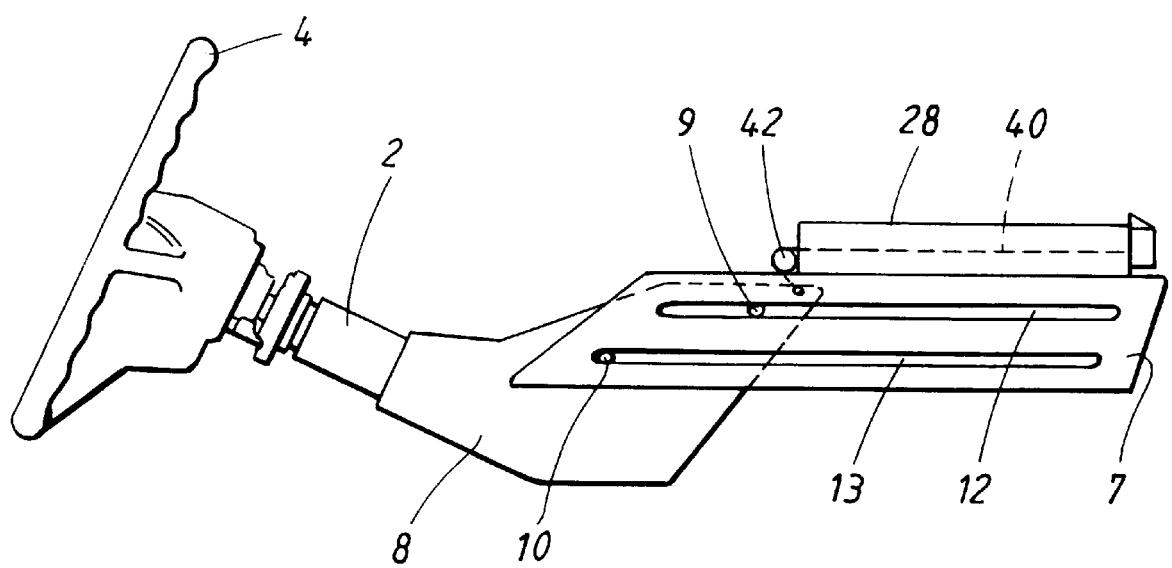
FIG. 5a is a side, elevational, partially diagrammatic view of the energy-absorption apparatus of the present invention shown as it appears after a collision.
Figure 5B:
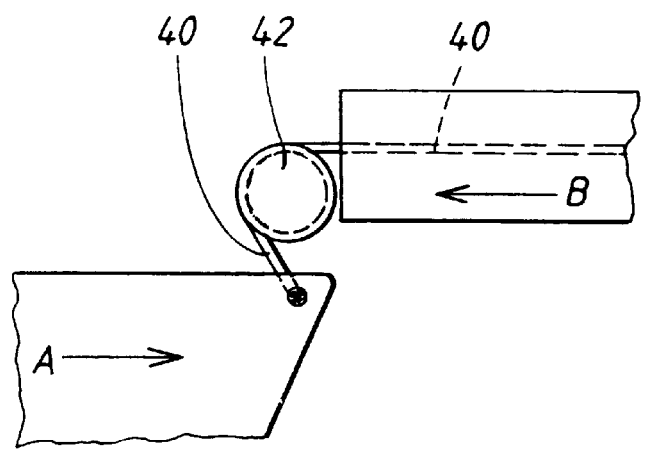

In the event of a collision, when the driver of the vehicle is thrown against the steering wheel 4, the lower part 8 connected to the steering column 2 is displaced in relation to the upper part 7. The appearance of the energy-absorbing mechanism 18 after a collision is shown in FIG. 5a. The direction of displacement is indicated by an arrow A in FIG. 5b. The displacement of the lower part 8 of the steering bracket 6 leads to a tensile force arising in the cable 40, by virtue of which the piston 24 is drawn through the tube 28 in a drawing direction indicated by an arrow B. In this respect, movement of the piston takes place in a direction opposite to the direction of displacement of the lower part 8. When the piston 24 moves in the direction indicated in FIG. 5b, this leads to the knife 26 at the same time working its way through the material in the tube 28. The resistance encountered by the knife 26 in this respect depends on the material thickness in the particular groove 30 to which the knife 26 is set. The groove 30 in the tube 28 thus perform two main functions, namely on the one hand to influence the energy absorption in the event of a collision and on the other hand to guide the knife 26 during the course of deformation.

The reason why a cable 40 has been selected as the force-transmitting member between the energy-absorbing mechanism 18 and the lower part 8 of the steering bracket 6 is that a very functionally reliable mechanism is thus obtained. If tracks or the like are used for transmitting forces, the risk of leaving the tracks is great if the steering bracket 6 is deformed in the event of unforeseen complications. Another reason is that the piston 24 can be rotated very easily inside the tube 28 when the knife 26 is to be set in a suitable notch 33 on the toothed tube edge 32.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for protecting a driver of a motor vehicle including a main steering shaft, said apparatus comprising a steering bracket for supporting said main steering shaft, said steering bracket including a first portion mounted on the body of said motor vehicle and a second portion mounted on said main steering shaft, said first and second portions of said steering bracket being relatively displaceable with respect to each other, an energy absorbing member including a plurality of grooves including a first groove having a first deformation resistance and a second groove having a second deformation resistance, said first and second deformation resistances being different, a cutting member mounted adjacent to said energy absorbing member, and setting means for setting a position of said cutting member with respect to said one of said first and second grooves in order to adjust the deformation resistance of said energy absorbing member, whereby upon said relative displacement of said first and second portions of said steering bracket said cutting member moves along one of said first and second grooves.

2. The apparatus of claim 1, wherein said energy-absorbing member includes a plurality of additional grooves, and wherein each of said plurality of additional grooves has a different deformation resistance.

3. The apparatus of claim 1, wherein said energy-absorbing member comprises a tubular member having a first end and a second end, and wherein said plurality of grooves are disposed longitudinally along said tubular member from said first end of said tubular member, said tubular member being connected to one of said first and second portions of said steering bracket and said cutting member being connected to the other of said first and second portions of said steering bracket.

4. The apparatus of claim 3, wherein said cutting member includes a plurality of cutting members for interacting with said plurality of grooves.

5. The apparatus of claim 3, including a rotatable guide piston having a first end and a second end and connected to one of said first and second portions of said steering bracket at said first end of said tubular member, and wherein said tubular member is affixed to said first portion of said steering bracket, and including a force transmission member for transmitting a force between said first and second portions of said steering bracket, said force transmission member comprising a cable having a first end affixed to said first end of said rotatable guide piston and passing through said tubular member and including a second end affixed to said other of said first and second portions of said steering bracket.

6. The apparatus of claim 5, including a guide member for guiding said cable from said second end of said tubular member to said other of said first and second portions of said steering bracket.

7. The apparatus of claim 6, wherein said guide member comprises a pulley.

8. The apparatus of claim 3, wherein said first end of said tubular member includes at least one notch disposed at an end of one of said plurality of grooves, whereby said notch can guide said cutting member to said at least one of said plurality of grooves.

9. The apparatus of claim 8, wherein said first end of said tubular member is saw-toothed including a plurality of said notches, each of said plurality of notches being disposed at the end of one of said plurality of grooves.

10. The apparatus of claim 1, wherein said energy-absorbing member comprises a tubular member having a first end, a second end and a first predetermined thickness, said first and second grooves having a second and third predetermined thickness, said first predetermined thickness being greater than said second and third predetermined thicknesses, and said second and third predetermined thicknesses being different.

11. The apparatus of claim 1, wherein said first groove has a first width and said second groove has a second width, said first width being different from said second width.

12. The apparatus of claim of 1, wherein said energy-absorbing member comprises a first predetermined material having a first predetermined deformation resistance, and wherein said first and second grooves comprise a second predetermined material having a second predetermined deformation resistance, said second predetermined deformation resistance being less than said first predetermined deformation resistance.

13. The apparatus of claim 1, including weight measurement means for measuring a weight of a driver seated in said motor vehicle, said weight measurement means being coupled to said setting means whereby said weight of said driver can be used to determine said position set by said setting means.

14. The apparatus of claim 1, wherein said energy-absorbing member comprises a tubular member having a first end and a second end, and including a rotatable guide piston connected to one of said first and second portions of said steering bracket at said first end of said tubular member, said cutting member being mounted on said rotatable guide piston.

15. The apparatus of claim 14, wherein said setting means comprises an electric actuator, and including a servomotor coupled to said electric actuator, and gear means driven by said servomotor, said gear means connected to said rotatable guide piston whereby said electric actuator controls said setting of said position of said cutting member with respect to said first and second grooves.

16. The apparatus of claim 14, wherein said energy-absorbing member comprises a tubular member, and wherein said setting means comprises an electric actuator, including a servomotor coupled to said electric actuator, and gear means driven by said servomotor, said gear means connected to said tubular member, whereby said electric actuator controls said setting of said position of said cutting member with respect to said first and second grooves.

17. The apparatus of claim 1, wherein said energy-absorbing member comprises a tubular member, said cutting member being attached to one of said first and second portions of said steering bracket, and said tubular member being rotatably mounted on said other of said first and second portions of said steering bracket.

18. The apparatus of claim 1, wherein said setting means comprises an electric actuator.

19. The apparatus of claim 1, including a detector for detecting whether or not a driver of said motor vehicle is wearing a seat belt, said detector coupled to said setting means whereby said detector can be used to determine said position set by said setting means.

* * * * *

UNITED STATES PATENT AND TRADEMARK OFFICE
CERTIFICATE OF CORRECTION

PATENT NO. : 6,241,284 B1      Page 1 of 1
DATED : June 5, 2001
INVENTOR(S) : De Verdier et al.

It is certified that error appears in the above-identified patent and that said Letters Patent is hereby corrected as shown below:

<u>Column 7,</u>
Line 27, after "tube" insert -- 28 --.

Signed and Sealed this

Nineteenth Day of February, 2002

Attest:

JAMES E. ROGAN
Attesting Officer      Director of the United States Patent and Trademark Office